US012643209B2

(12) United States Patent
Bailey et al.

(10) Patent No.: US 12,643,209 B2
(45) Date of Patent: Jun. 2, 2026

(54) INERTIAL FAN FOR POWER TOOL

(71) Applicant: MILWAUKEE ELECTRIC TOOL CORPORATION, Brookfield, WI (US)

(72) Inventors: Matthew R. Bailey, Racine, WI (US); Will Didier, Cedarburg, WI (US); Jeffrey C. Hessenberger, Neosho, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/966,818

(22) Filed: Dec. 3, 2024

(65) Prior Publication Data

US 2025/0091184 A1 Mar. 20, 2025

Related U.S. Application Data

(62) Division of application No. 18/138,435, filed on Apr. 24, 2023, now Pat. No. 12,162,124, which is a
(Continued)

(51) Int. Cl.
*B25C 1/06* (2006.01)
*B25F 5/00* (2006.01)
*H02K 9/06* (2006.01)

(52) U.S. Cl.
CPC ................ *B25C 1/06* (2013.01); *B25F 5/008* (2013.01); *H02K 9/06* (2013.01)

(58) Field of Classification Search
CPC ........... B25C 1/06; B25C 1/047; B25F 5/008; H02K 9/06
See application file for complete search history.

(56) References Cited

U.S. PATENT DOCUMENTS 1,421,958 A 7/1922 Kirby
1,447,419 A 3/1923 Kirby
(Continued)

FOREIGN PATENT DOCUMENTS

CN 109194030 A 1/2019
CN 208939758 U 6/2019
(Continued)

OTHER PUBLICATIONS

International Search Report and Written Opinion for Application No. PCT/US2019/026019, dated Jul. 23, 2019, 9 pages.

*Primary Examiner* — Andrew M Tecco
(74) *Attorney, Agent, or Firm* — Michael Best & Friedrich LLP

(57) ABSTRACT

A power tool includes an electric motor having a motor shaft and a fan assembly attachable to the motor shaft for rotation in a first rotational direction to generate an airflow for cooling the electric motor. The fan assembly includes a fan body, a bearing that rotates with the fan body, and a flywheel having a central portion that defines a central bore configured to receive the bearing so that the bearing is rotatably affixed to the flywheel. The power tool further includes a spring configured to receive torque from the electric motor such that the torque winds the spring to store energy when the electric motor is activated and release the energy to supply torque to the fan assembly so that the fan assembly continues to rotate and generate the airflow for cooling the electric motor when the electric motor is deactivated.

6 Claims, 12 Drawing Sheets

Related U.S. Application Data division of application No. 16/376,513, filed on Apr. 5, 2019, now Pat. No. 11,667,021.

(60) Provisional application No. 62/658,183, filed on Apr. 16, 2018.

(56) References Cited

U.S. PATENT DOCUMENTS

| | | | |
|---|---|---|---|
| 3,426,261 A | | 2/1969 | Wallin et al. |
| 3,906,266 A | * | 9/1975 | Cowman .............. B23Q 1/0009 |
| | | | 310/74 |
| 5,375,637 A | | 12/1994 | Matsumoto et al. |
| 7,091,635 B1 | * | 8/2006 | Gilliland .................. H02K 9/06 |
| | | | 310/63 |
| 7,171,997 B2 | | 2/2007 | Nishikawa et al. |
| 10,193,417 B2 | * | 1/2019 | Fogle ........................ B25F 5/00 |
| 10,594,188 B2 | * | 3/2020 | Davidson ............... H02K 11/30 |
| 2011/0303718 A1 | | 12/2011 | Spasov et al. |
| 2014/0056703 A1 | * | 2/2014 | Vaughn ................. F04D 29/282 |
| | | | 415/213.1 |
| 2016/0181891 A1 | * | 6/2016 | Fogle ................... H02K 1/2791 |
| | | | 310/43 |
| 2016/0211723 A1 | * | 7/2016 | Davidson ............... H02K 11/30 |
| 2018/0133877 A1 | | 5/2018 | Ueda |
| 2019/0255690 A1 | | 8/2019 | Kondou et al. |
| 2021/0299839 A1 | | 9/2021 | Furusawa et al. |

FOREIGN PATENT DOCUMENTS

| | | |
|---|---|---|
| CN | 208939759 U | 6/2019 |
| CN | 214870320 U | 11/2021 |
| CN | 114189105 A | 3/2022 |
| CN | 115411883 A | 11/2022 |
| JP | H0720069 U | 4/1995 |
| JP | 2008187766 A | 8/2008 |
| JP | 2010076035 A | 4/2010 |
| JP | 2010201516 A | 9/2010 |
| JP | 5327706 B2 | 10/2013 |
| JP | 5614602 B2 | 10/2014 |

* cited by examiner

3166

3086

3046

3066

3000

INERTIAL FAN FOR POWER TOOL

CROSS-REFERENCE TO RELATED APPLICATIONS

This application is a divisional of U.S. Non-Provisional patent application Ser. No. 18/138,435 filed on Apr. 24, 2023, now U.S. Pat. No. 12,162,124, which is a divisional of U.S. Non-Provisional patent application Ser. No. 16/376,513 filed on Apr. 5, 2019, now U.S. Pat. No. 11,667,021, which claims priority to U.S. Provisional Patent Application No. 62/658,183 filed on Apr. 16, 2018, the entire contents of all of which are incorporated herein by reference.

FIELD OF THE INVENTION

The present invention relates generally to power tools, and more specifically to fan assemblies for power tools such as fastener drivers.

BACKGROUND OF THE INVENTION

Many power tools (e.g., fastener drivers, miter saws, etc.), operate via intermittent, relatively short periods of motor activation interrupted by relatively longer periods of motor deactivation. Such power tools often include fan assemblies rotated by the motor to provide cooling airflow and ventilation for various components of the power tool. Such fan assemblies are typically fixed to a motor shaft to co-rotate with the motor shaft and thus cannot generate cooling airflow during periods of motor deactivation.

SUMMARY OF THE INVENTION

The present invention provides, in one aspect, a power tool including an electric motor having a motor shaft that rotates about a motor axis in a first rotational direction and a fan assembly attachable to the motor shaft for rotation in the first rotational direction to generate an airflow for cooling the electric motor. The fan assembly includes a fan body, a bearing that rotates with the fan body, the bearing being freely rotatable about the motor axis in the first rotational direction and fixed against rotation about the motor axis in a second rotational direction opposite the first rotational direction, and a flywheel rotatably affixed to the fan body. The flywheel has a central portion that defines a central bore configured to receive the bearing so that the bearing is rotatably affixed to the flywheel. The power tool further includes a spring coupled to the electric motor and the fan assembly. The spring is configured to receive torque from the electric motor such that the torque winds the spring to store energy when the electric motor is activated and release the energy to supply torque to the fan assembly so that the fan assembly continues to rotate and generate the airflow for cooling the electric motor when the electric motor is deactivated.

The present invention provides, in another aspect, a power tool including an electric motor having a motor shaft that rotates about a motor axis in a first rotational direction and a fan assembly attachable to the motor shaft for rotation in the first rotational direction to generate an airflow for cooling the electric motor. The fan assembly includes a fan body, a bearing that rotates with the fan body, the bearing being freely rotatable about the motor axis in the first rotational direction and fixed against rotation about the motor axis in a second rotational direction opposite the first rotational direction, and a flywheel rotatably affixed to the fan body. The flywheel has a central portion that defines a central bore configured to receive the bearing so that the bearing is rotatably affixed to the flywheel. The power tool further includes an air compression and storage device coupled to the motor shaft. The air compression and storage device is configured to receive torque from the electric motor to compress and store air when the electric motor is activated and release the air to generate a secondary airflow for cooling the electric motor when the electric motor is deactivated.

The present invention provides, in another aspect, a power tool including an electric motor having a motor shaft that rotates about a motor axis in a first rotational direction and a fan assembly attachable to the motor shaft for rotation in the first rotational direction to generate an airflow for cooling the electric motor. The fan assembly includes a fan body, a bearing that rotates with the fan body, the bearing being freely rotatable about the motor axis in the first rotational direction and fixed against rotation about the motor axis in a second rotational direction opposite the first rotational direction, and a flywheel rotatably affixed to the fan body. The flywheel has a central portion that defines a central bore configured to receive the bearing so that the bearing is rotatably affixed to the flywheel. The power tool further includes an auxiliary fan electrically coupled to a power source. The auxiliary fan is configured to generate a secondary airflow for cooling the electric motor when the power source supplies electrical power to the auxiliary fan after the electric motor is deactivated.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-6 illustrate a power tool, such as a gas spring-powered fastener driver 10, that includes a fan assembly 86 (FIG. 4) operable to supply cooling airflow to various components of the power tool, as will be described in further detail below. Although the fan assembly 86 will be described below in the context of the fastener driver 10, the fan assembly 86 can equally be applied to other motorized power tools in which the motor rotates in only one direction (e.g., reciprocating saws, miter saws, grinders, palm sanders, etc.).

Figure 1:
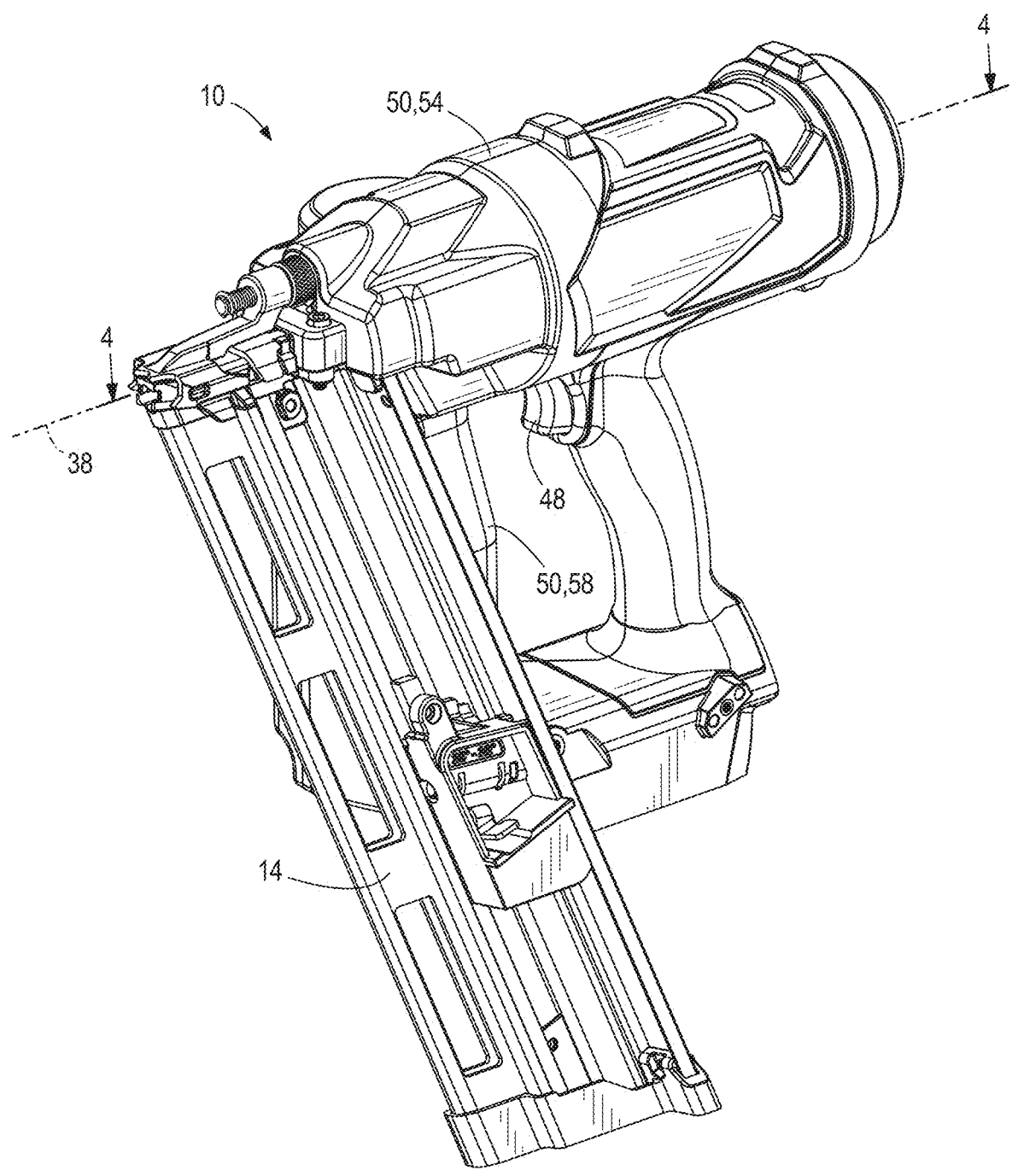
FIG. 1 is a perspective view of a gas spring-powered fastener driver in accordance with an embodiment of the invention.
Figure 2:
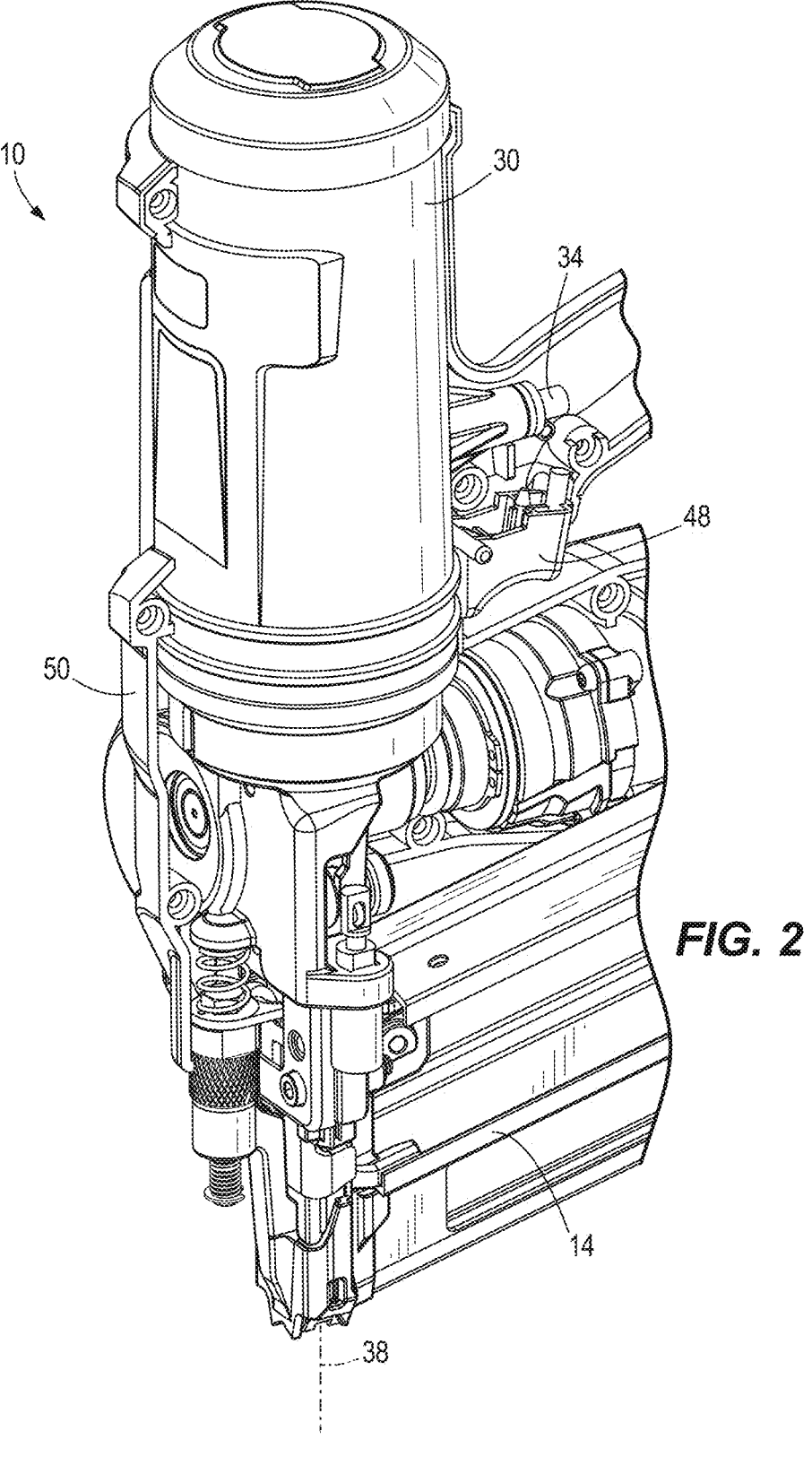
FIG. 2 is a partial cut-away view of the fastener driver of FIG. 1.
Figure 5:
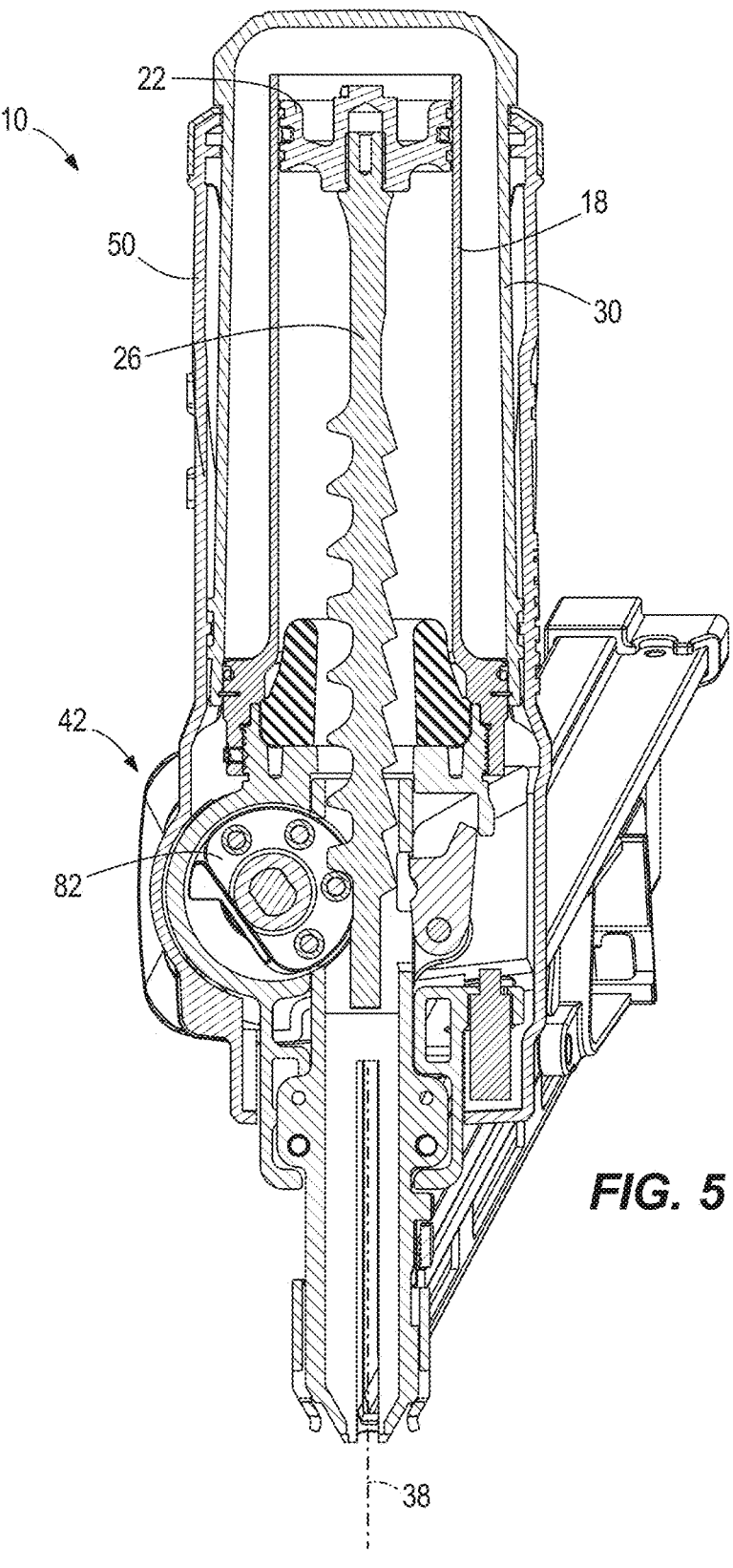
FIG. 5 is a cross-sectional view of the fastener driver of FIG. 1 taken along line 5-5 of FIG. 3, illustrating a driver blade in a ready position.

With reference to FIGS. 1-2, the gas spring-powered fastener driver 10 is operable to drive fasteners (e.g., nails, tacks, staples, etc.) held within a magazine 14 into a workpiece. The fastener driver 10 includes a cylinder 18 and a moveable piston 22 positioned within the cylinder 18 (FIG. 5). With reference to FIG. 5, the fastener driver 10 further includes a driver blade 26 that is attached to the piston 22 and moveable therewith. The fastener driver 10 does not require an external source of air pressure, but rather includes a storage chamber cylinder 30 of pressurized gas in fluid communication with the cylinder 18. In the illustrated embodiment, the cylinder 18 and moveable piston 22 are positioned within the storage chamber cylinder 30. With reference to FIG. 2, the driver 10 further includes a fill valve 34 coupled to the storage chamber cylinder 30. When connected with a source of compressed gas, the fill valve 34 permits the storage chamber cylinder 30 to be refilled with compressed gas if any prior leakage has occurred. The fill valve 34 may be configured as a Schrader valve, for example.

Figure 6:
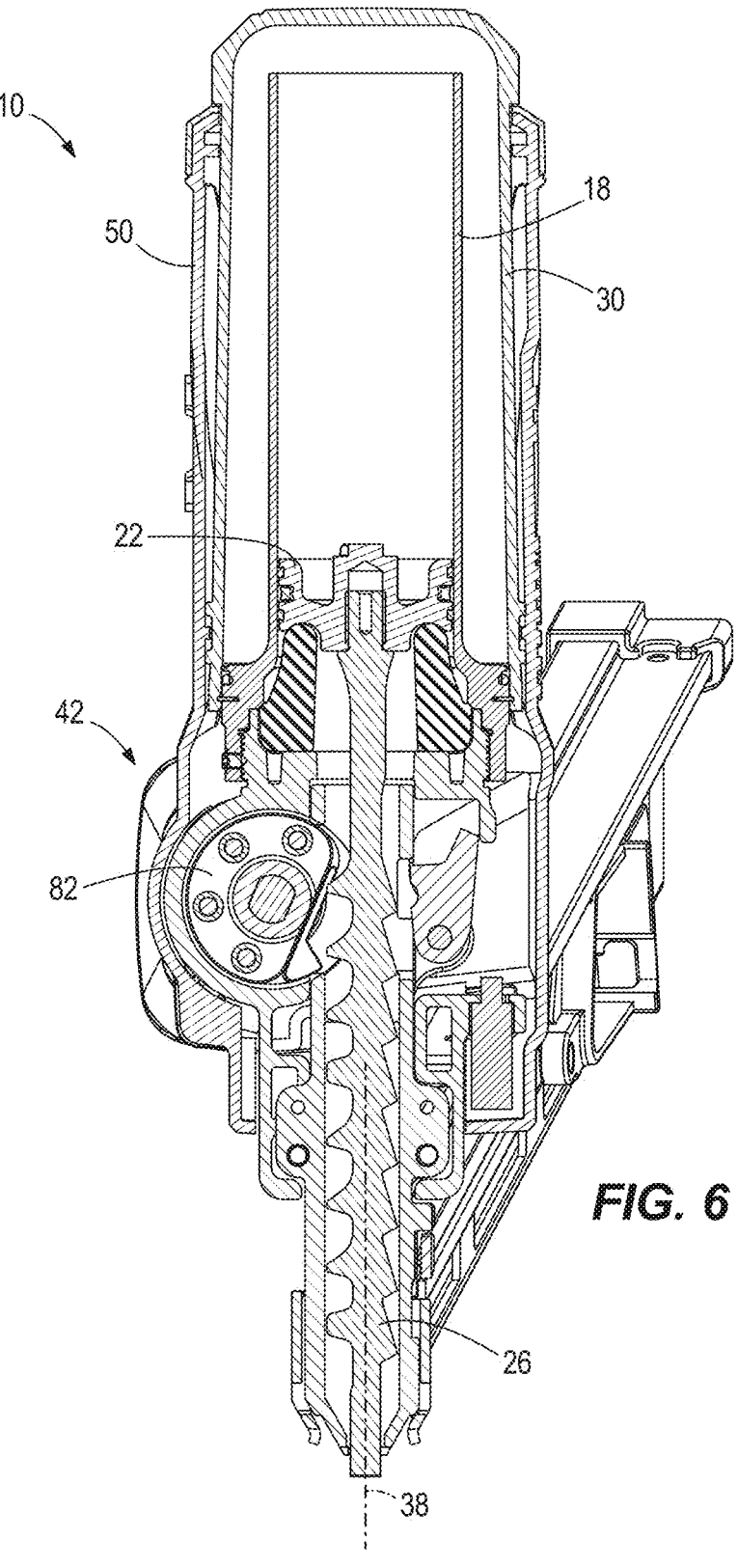
FIG. 6 is a cross-sectional view of the fastener driver of FIG. 1 taken along line 5-5 of FIG. 3, illustrating the driver blade in a driven position.
Figures 7, 8:
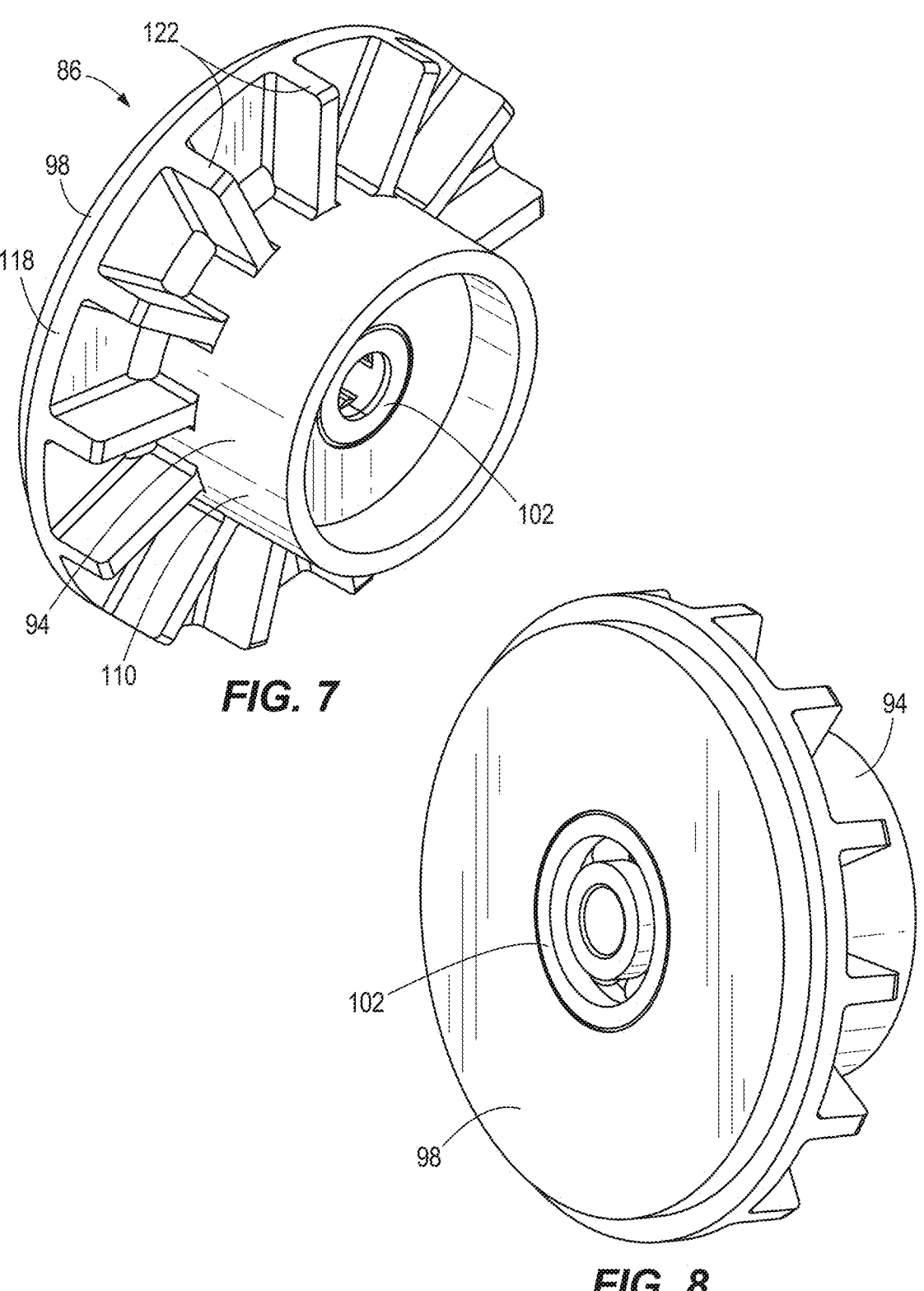
FIG. 7 is a perspective view of the fan assembly of FIG. 4.
FIG. 8 is another perspective view of the fan assembly of FIG. 4.

With reference to FIGS. 5 and 6, the cylinder 18 and the driver blade 26 define a driving axis 38, and during a driving cycle the driver blade 26 and piston 22 are moveable between a ready position (i.e., top dead center; see FIG. 5) and a driven position (i.e., bottom dead center; see FIG. 6). The fastener driver 10 further includes a lifting assembly 42, which is powered by a motor 46 (FIG. 4), and which is operable to move the driver blade 26 from the driven position to the ready position.

In operation, the lifting assembly 42 drives the piston 22 and the driver blade 26 to the ready position by energizing the motor 46. As the piston 22 and the driver blade 26 are driven to the ready position, the gas above the piston 22 and the gas within the storage chamber cylinder 30 is compressed. Once in the ready position, the piston 22 and the driver blade 26 are held in position until released by user activation of a trigger 48 (FIG. 1). When released, the compressed gas above the piston 22 and within the storage chamber 30 drives the piston 22 and the driver blade 26 to the driven position, thereby driving a fastener into a workpiece. The illustrated fastener driver 10 therefore operates on a gas spring principle utilizing the lifting assembly 42 and the piston 22 to further compress the gas within the cylinder 18 and the storage chamber cylinder 30. Further detail regarding the structure and operation of the fastener driver 10 is provided below.

Figure 3:
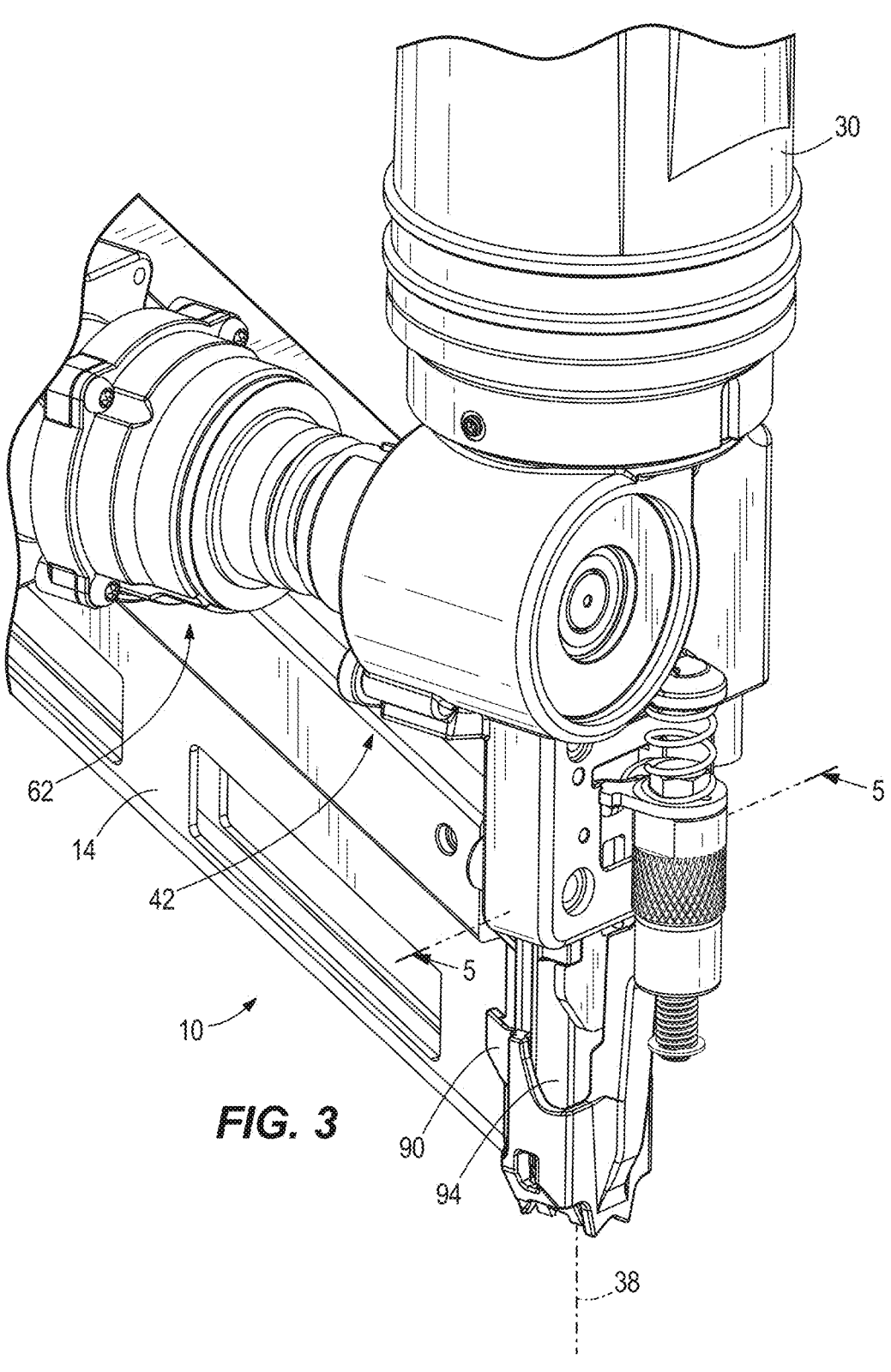
FIG. 3 is another partial cut-away view of the fastener driver of FIG. 1.
Figure 4:
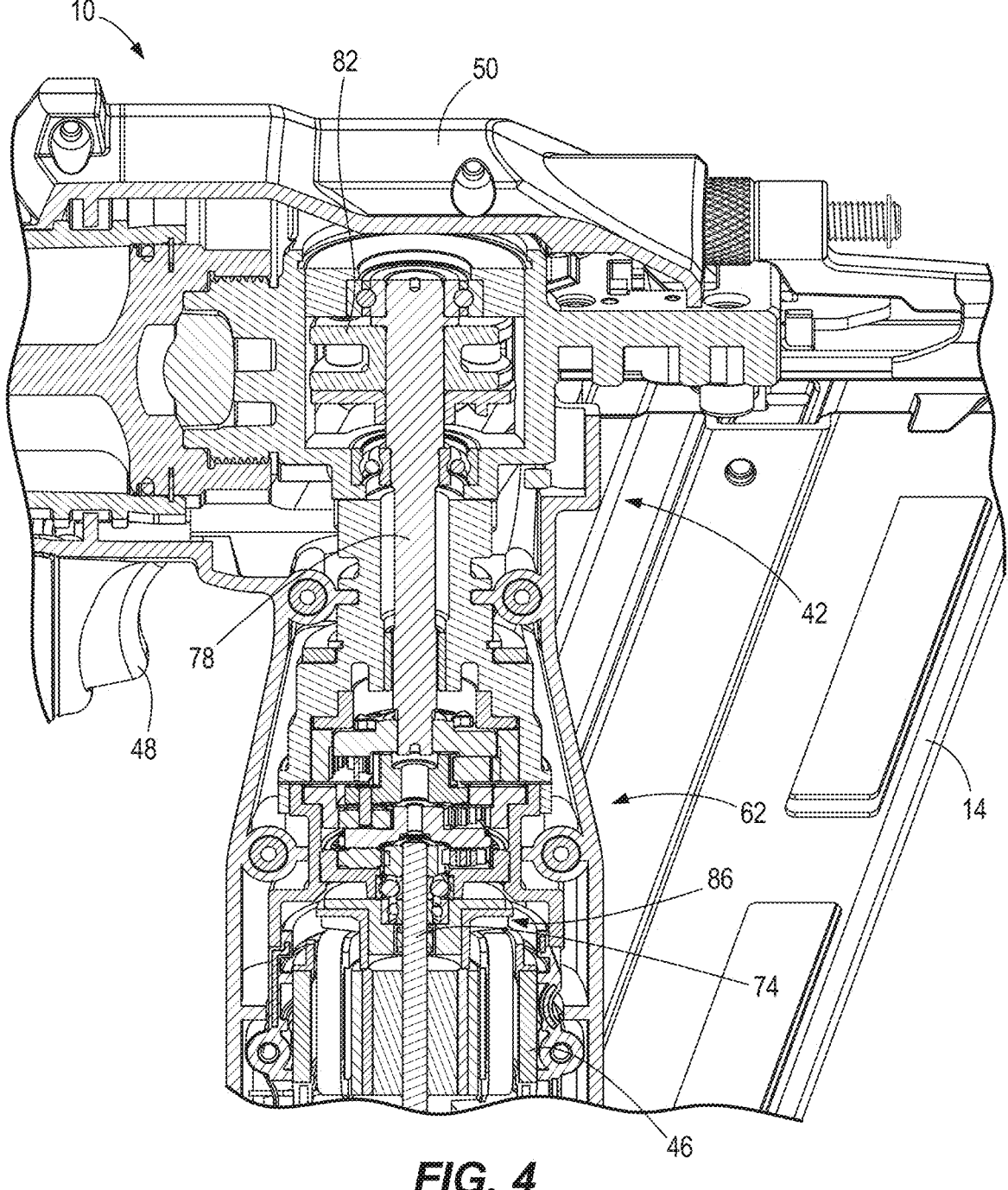
FIG. 4 is a cross-sectional view of the fastener driver of FIG. 1 taken along line 4-4 shown in FIG. 1, illustrating a motor, a transmission, and a fan assembly.

With reference to FIGS. 2 and 3, the driver 10 includes a housing 50 formed from clamshell housing halves. The housing 50 includes a cylinder support portion 54 (FIG. 1) in which the storage chamber cylinder 30 is at least partially positioned and a transmission housing portion 58 in which a transmission 62 (FIG. 4) is at least partially positioned. The transmission 62 is a component of the lifting assembly 42, which raises the driver blade 26 from the driven position to the ready position. With reference to FIG. 4, the motor 46 is also a component of the lifting assembly 42 and is coupled to the transmission housing portion 58 for providing torque to the transmission 62 when activated. A battery (not shown) is electrically connectable to the motor 46 for supplying electrical power to the motor 46. In alternative embodiments, the driver may be powered from an AC voltage input (i.e., from a wall outlet), or by an alternative DC voltage input (e.g., a DC power support).

With reference to FIG. 4, the transmission 62 rotatably couples to a motor output shaft 74, and includes a transmission output shaft 78 extending to a lifter 82 of the lifting assembly 42 (FIG. 3) The lifter 82 is operable to move the driver blade 26 from the driven position to the ready position. The transmission 62 provides torque to the lifter 82 from the motor 46. The fan assembly 86 is rotatably coupled to the motor shaft 74 to generate cooling airflow within an interior of the fastener driver 10, as will be discussed further below.

With reference to FIGS. 7-13, the fan assembly 86 rotates about a motor axis 90 (FIG. 4) and includes a fan body 94 having an annular shape, a flywheel 98 having an annular shape similar to the shape of the fan body 94, a first bearing 102, and a second bearing 106. The fan body 94 includes a first central portion 110 defining a first central bore 114, a first flange portion 118 extending radially about one end the first central portion 110, and fan blades 122 extending axially from the first flange portion 118. As the fan body 94 rotates during operation, the fan blades 122 generate airflow within an interior of the fastener driver 10 to cool the motor 46, transmission 62, and other internal components.

Figures 9, 10:
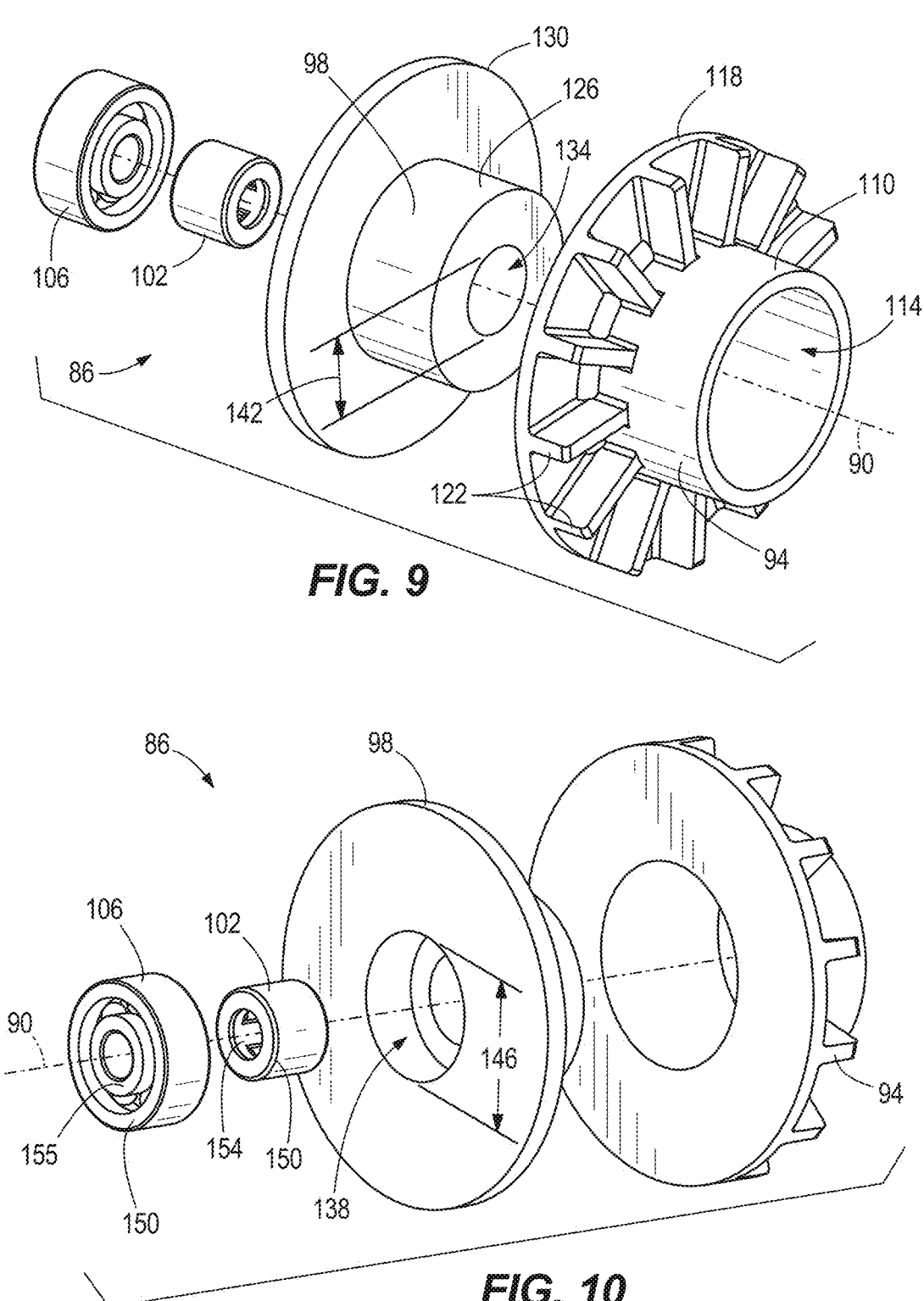
FIG. 9 is a partially exploded front perspective view of the fan assembly of FIG. 4.
FIG. 10 is a partially exploded rear perspective view of the fan assembly of FIG. 4.
Figures 11, 12:
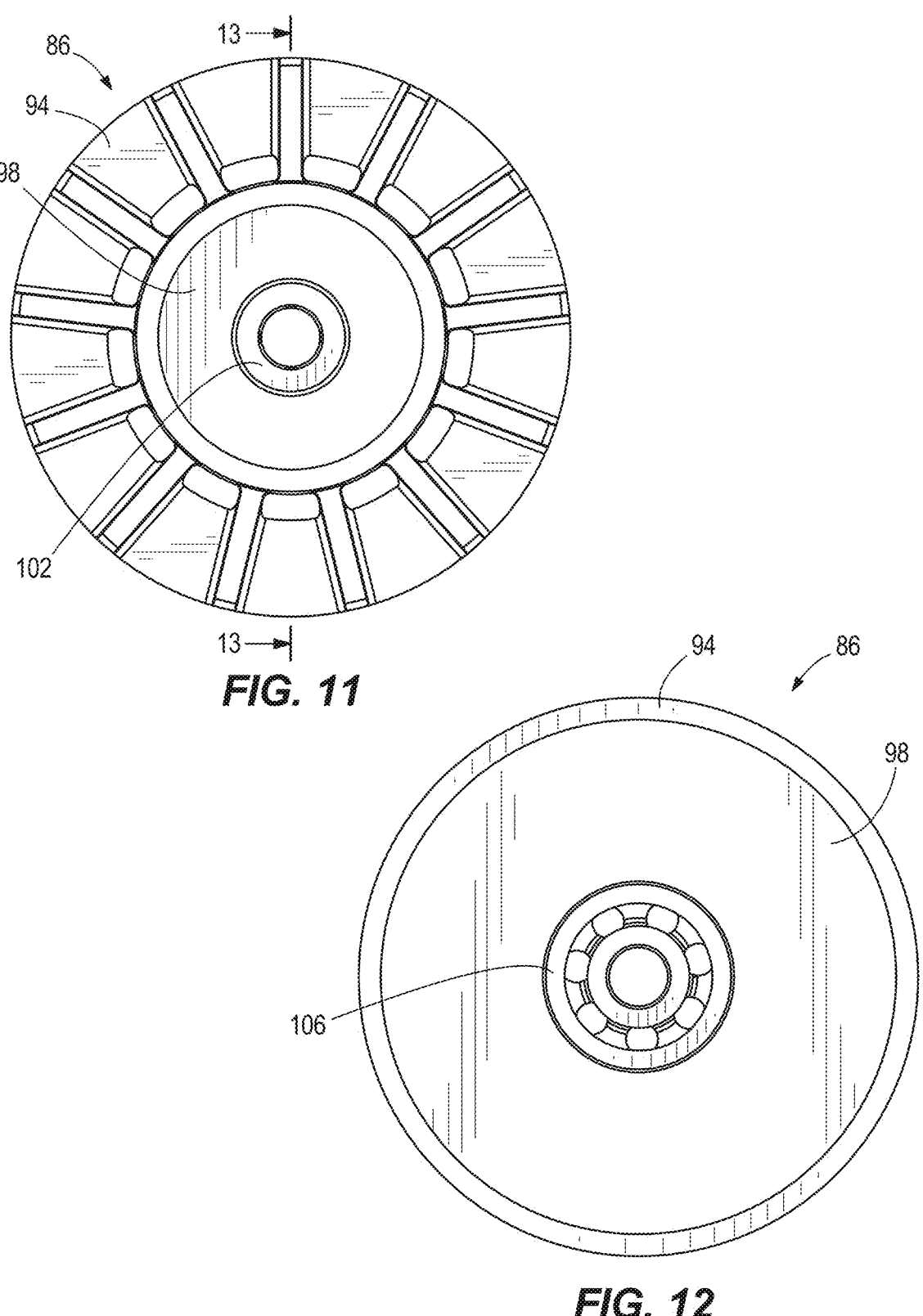
FIG. 11 is a front view of the fan assembly of FIG. 4.
FIG. 12 is a rear view of the fan assembly of FIG. 4.
Figure 13:
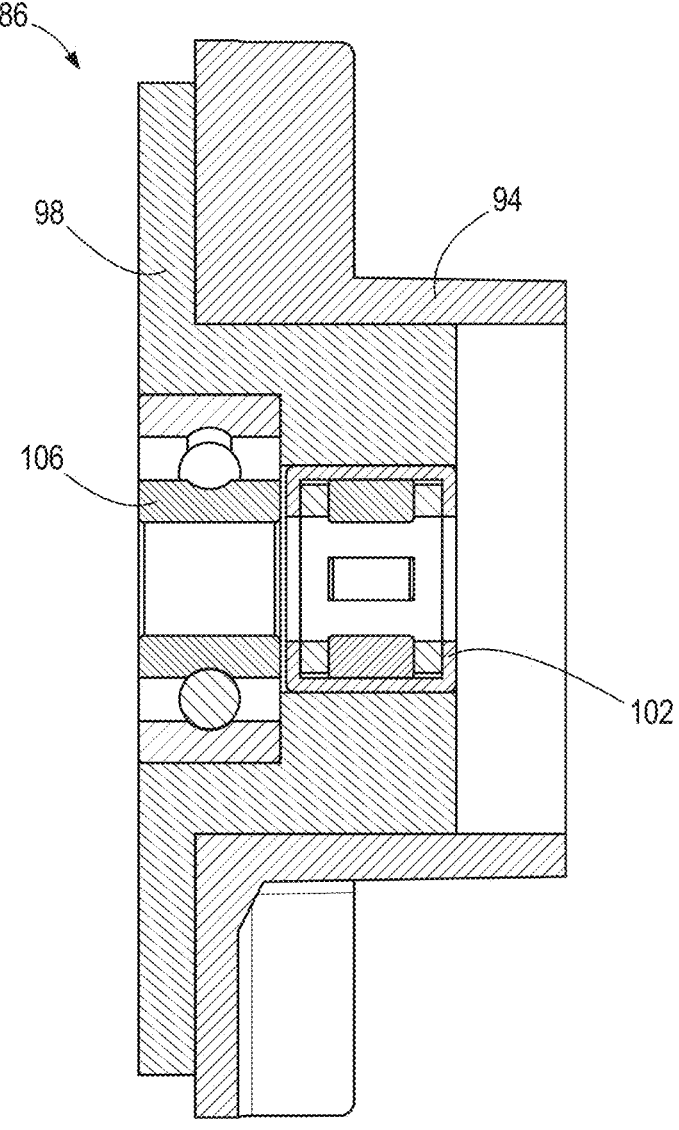
FIG. 13 is a cross-sectional view of the fan assembly of FIG. 4, taken along line 13-13 of FIG. 11.

Referring to FIGS. 9 and 10, the flywheel 98 includes a second central portion 126 and a second flange portion 130 extending radially about one end of the second central portion 126. The second central portion 126 of the flywheel 98 defines a second central bore 134 and a third central bore 138 adjacent the second central bore 134. In the illustrated embodiment, the second central bore 134 has a first diameter 142 and the third central bore has a second diameter 146 larger than the first diameter 142. In other embodiments, the second diameter 146 may be equal to or less than the first diameter 142.

The flywheel 98 couples to the fan body 94 and provides an inertial mass to increase a moment of inertia of the fan assembly 86 about the motor axis 90 during operation. In the illustrated embodiment, the first central bore 114 of the fan body 94 receives the second central portion 126 of the flywheel 98 by interference fit to secure the flywheel 98 to the fan body 94. In other embodiments (not shown), the flywheel 98 may be secured to the fan body 94 by other means (e.g., fasteners, adhesive, etc.) recognizable to one of ordinary skill.

The flywheel 98 receives the first bearing 102 into the second central bore 134 (e.g., by interference fit), and also receives the second bearing 106 into the third central bore 138 (e.g., by interference fit), so that an outer race 150 of each bearing 102, 106 is rotationally fixed to the flywheel 98. In other embodiments (not shown), the fan assembly 86 does not include the flywheel 98, and the first and second bearings 102, 106 are instead directly received by the first central bore 114 of the fan body 94. In the illustrated embodiment, the first bearing 102 further includes a cage 154 that supports a plurality of rollers. The rollers engage a rotating shaft, such as the motor shaft 74 of the motor 46. The second bearing 106 further includes an inner race 155 that receives and is rotationally affixed to the motor shaft 74.

In the illustrated embodiment, the first bearing 102 is a one-way bearing (e.g., a one-way needle bearing, a one-way sprag bearing, etc.) that is freely rotatable about the motor axis 90 in a first rotational direction, but which locks against rotation about the motor axis 90 in a second rotational direction opposite the first rotational direction. Specifically, the outer race 150 of the first bearing 102 is rotatable in the first rotational direction relative to motor shaft 74, but is fixed against rotation in the second rotational direction relative to the motor shaft 74. In contrast, the second bearing 106 is a two-way bearing (e.g., a plain bearing, a ball bearing, a roller bearing, etc.) that is freely rotatable about the motor axis 90 in each of the first and second directions.

In operation, with the fan assembly 86 coupled to the motor shaft 74 of the fastener driver 10, the motor 46 is activated to accelerate the motor shaft 74 in the first rotational direction. Because the first bearing 102 locks against rotation in the second rotational direction, the motor shaft 74 drives the fan assembly 86 to co-rotate in synchronization with the motor shaft 74 as the motor shaft 74 accelerates in the first rotational direction. As the fan assembly 86 accelerates, it accumulates rotational inertia and the fan body 94 generates airflow within the interior of the fastener driver 10. The fan assembly 86 continues to co-rotate with the rotating motor shaft 74 until the motor 46 is deactivated.

Upon deactivation of the motor 46, the motor shaft 74 begins to decelerate (i.e., due to internal frictional forces, an external load on the fastener driver 10, and/or motor controls which actively decelerate the motor shaft 46) and may eventually stop rotating completely. However, because the bearings 102, 106 permit the fan assembly 86 to rotate freely in the first direction relative to the motor shaft 74, the fan assembly 86 does not decelerate at the same rate as the motor shaft 74. Instead, the fan assembly 86 continues to rotate in the first rotational direction after the motor shaft 74 has stopped due to the rotational inertia of the fan assembly 86 (as amplified by the flywheel 98). In this way, the fan body 94 continues to rotate and generate cooling airflow for the motor 46 after the motor 46 is deactivated and the motor shaft 74 is stopped. The fan assembly 86 gradually decelerates (i.e., due to frictional forces generated in the bearings 102 and 106, the fan body 94, etc.) until the motor 46 is reactivated, and the process is repeated.

Figures 14, 15:
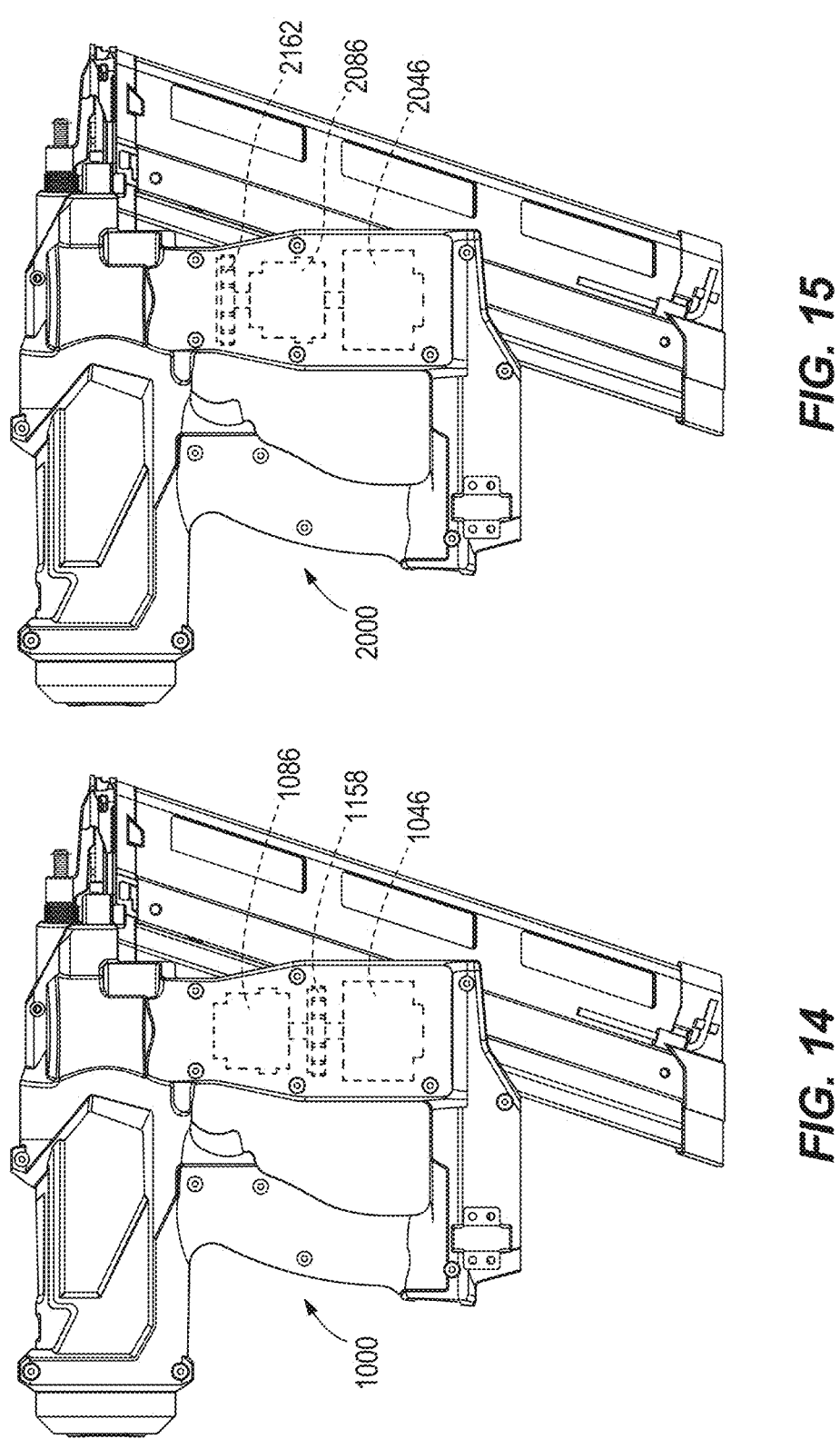
FIG. 14 is a schematic view of a gas spring-powered fastener driver in accordance with another embodiment of the invention.
FIG. 15 is a schematic view of a gas spring-powered fastener driver in accordance with another embodiment of the invention.

FIG. 14 schematically illustrates another fastener driver 1000 according to another embodiment of the invention. The fastener driver 1000 is similar to the fastener driver 10 and includes substantially the same structure as the fastener driver 10. Specifically, the fastener driver 1000 includes a motor 1046 and a fan assembly 1086 rotatably coupled to the motor 1046. The fastener driver 1000 also includes an energy storage device embodied as a spring 1158 that is coupled to each of the motor 1046 and the fan assembly 1086. In operation, the motor 1046 is activated to supply torque to each of the fan assembly 1086 and the spring 1158. The torque supplied to the fan assembly 1086 causes the fan assembly 1086 to rotate, thereby generating an airflow within the interior of the fastener driver 1000. The torque supplied to the spring 1158 winds the spring 1158 to store energy. Upon deactivation, the motor 1046 stops supplying torque to each of the fan assembly 1086 and the spring 1158. The wound spring 1158 subsequently releases the stored energy by supplying torque to the fan assembly 1086, so that the fan assembly 1086 continues to rotate and generate cooling airflow for the motor 46 after the motor 1046 is deactivated.

FIG. 15 schematically illustrates another fastener driver 2000 according to another embodiment of the invention. The fastener driver 2000 is similar to the fastener driver 10 and includes substantially the same structure as the fastener driver 10. Specifically, the fastener driver 2000 includes a motor 2046 and a fan assembly 2086 rotatably coupled to the motor 2046. The fastener driver 2000 also includes an energy storage device embodied as an air compression and storage device 2162 that is also coupled to the fan assembly 2086. In operation, the motor 2046 is activated to supply torque to each of the fan assembly 2086 and the air compression and storage device 2162. The torque supplied to the fan assembly 2086 causes the fan assembly 2086 to rotate, thereby generating an airflow within the interior of the fastener driver 2000. The torque supplied to the air compression and storage device 2162 drives the device 2162 to compress air and store the compressed air. Upon deactivation, the motor 2046 stops supplying torque to each of the fan assembly 2086 and the air compression and storage device 2162. The air compression and storage device 2162 subsequently releases the compressed air to generate an airflow within the interior of the fastener driver 2000 for cooling the motor 2046 after the motor 2046 is deactivated.

Figure 16:
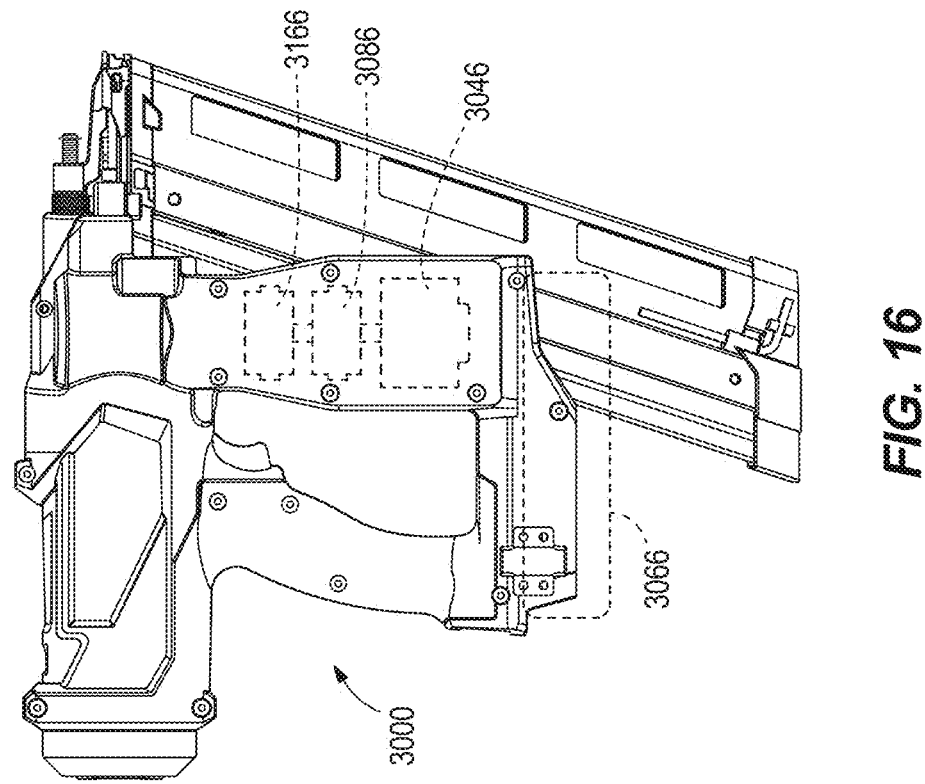
FIG. 16 is a schematic view of a gas spring-powered fastener driver in accordance with another embodiment of the invention.

FIG. 16 schematically illustrates another fastener driver 3000 according to another embodiment of the invention. The fastener driver 3000 is similar to the fastener driver 10 and includes substantially the same structure as the fastener driver 10. Specifically, the fastener driver 3000 includes a motor 3046 and a fan assembly 3086 rotatably coupled to the motor 3046. The fastener driver 3000 also includes an auxiliary fan 3166 that selectively generates a secondary airflow within the interior of the fastener driver 3000. A power source 3066 (e.g., a battery pack or a charged capacitor) is electrically coupled to the auxiliary fan 3166 to supply electrical power thereto. In operation, the motor 3046 is activated to supply torque to the fan assembly 3086. The torque supplied to the fan assembly 3086 causes the fan assembly 3086 to rotate, thereby generating an airflow within the interior of the fastener driver 3000. The auxiliary fan 3166 remains deactivated while the motor 3046 is activated. Upon deactivation of the motor 3046, power is supplied from the power source 3066 to the auxiliary fan 3166 to generate the secondary airflow within the interior of the fastener driver 3000 for cooling the motor 3046 after the motor 3046 is deactivated.

Various features of the invention are set forth in the following claims.

What is claimed is:

1. A power tool comprising:

an electric motor having a motor shaft that rotates about a motor axis in a first rotational direction;

a fan assembly attachable to the motor shaft for rotation in the first rotational direction to generate an airflow for cooling the electric motor, the fan assembly including a fan body, a bearing that rotates with the fan body, the bearing being freely rotatable about the motor axis in the first rotational direction and fixed against rotation about the motor axis in a second rotational direction opposite the first rotational direction, and a flywheel rotatably affixed to the fan body, the flywheel having a central portion that defines a central bore configured to receive the bearing so that the bearing is rotatably affixed to the flywheel; and a spring coupled to the electric motor and the fan assembly, the spring is configured to receive torque from the electric motor such that the torque winds the spring to store energy when the electric motor is activated and release the energy to supply torque to the fan assembly so that the fan assembly continues to rotate and generate the airflow for cooling the electric motor when the electric motor is deactivated.

2. The power tool of claim 1, wherein the bearing is a first bearing, and wherein the fan assembly further includes a second bearing freely rotatable about the motor axis in the first rotational direction and the second rotational direction.

3. The power tool of claim 2, wherein the second bearing is rotatably affixed to the flywheel.

4. The power tool of claim 2, wherein the central portion is a first central portion and the central bore is a first central bore, and wherein the flywheel has a second central portion that defines a second central bore configured to receive the second bearing so that the second bearing is rotatably affixed to the flywheel.

5. The power tool of claim 2, wherein the first bearing includes a cage configured to support a plurality of rollers configured to engage the motor shaft and the second bearing includes a race configured to receive and be rotationally affixed to the motor shaft.

6. The power tool of claim 5, wherein the first bearing is a one-way bearing and the second bearing is a two-way bearing.

\* \* \* \* \*